No. 831,948. PATENTED SEPT. 25, 1906.
G. S. GUNDERSEN.
RAILWAY MOTOR TRUCK.
APPLICATION FILED JUNE 19, 1903. RENEWED APR. 12, 1906.

4 SHEETS—SHEET 1.

Witnesses
Horace E. Stuart
P. P. King

Inventor
Gilbert S. Gundersen
By T. H. Lockwood
His Attorney

No. 831,948. PATENTED SEPT. 25, 1906.
G. S. GUNDERSEN.
RAILWAY MOTOR TRUCK.
APPLICATION FILED JUNE 19, 1903. RENEWED APR. 12, 1906.
4 SHEETS—SHEET 2.
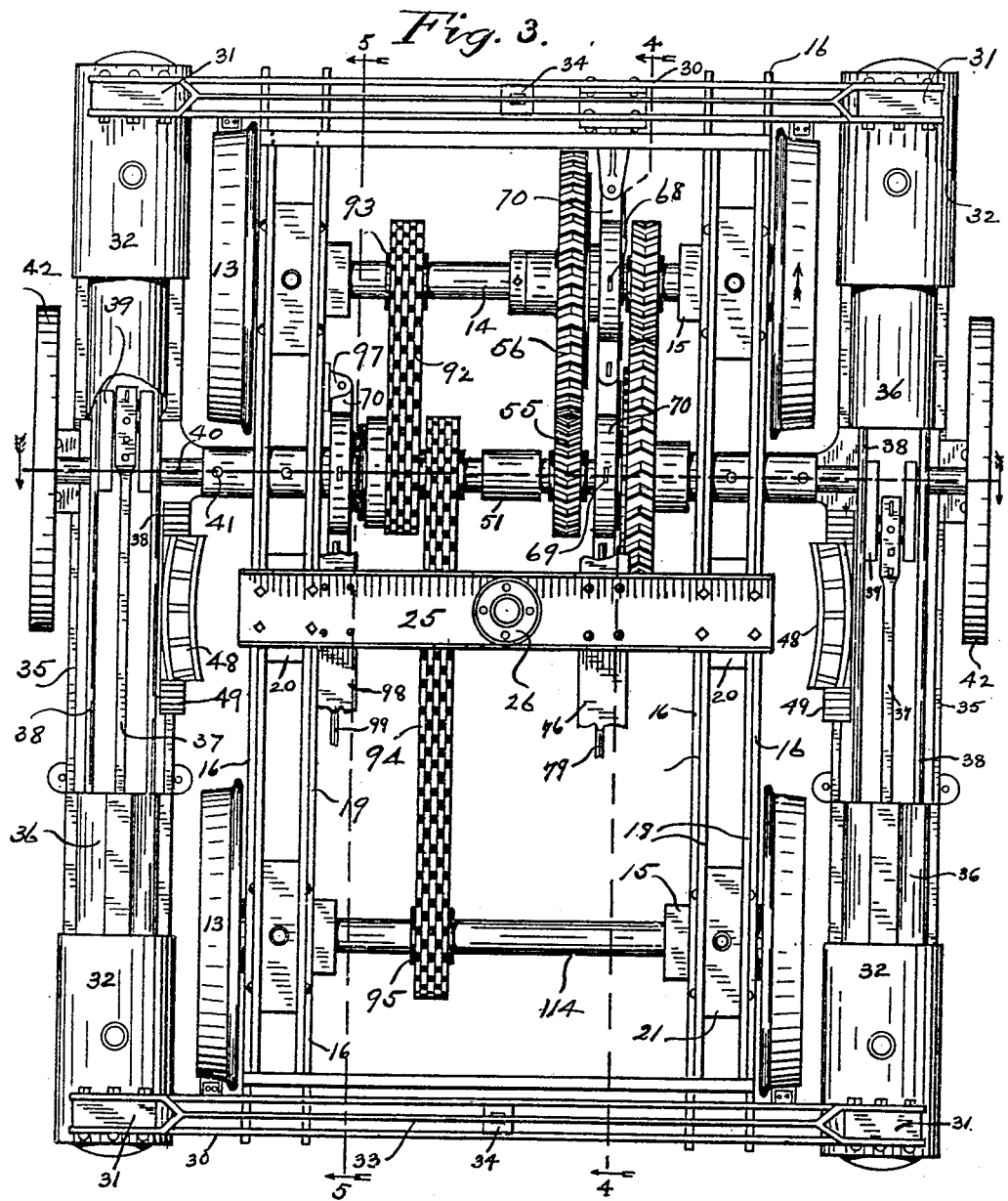
Witnesses
Horace G. Stuart.
R. P. King.
Inventor
Gilbert S. Gundersen
By V. H. Lockwood
His Attorney

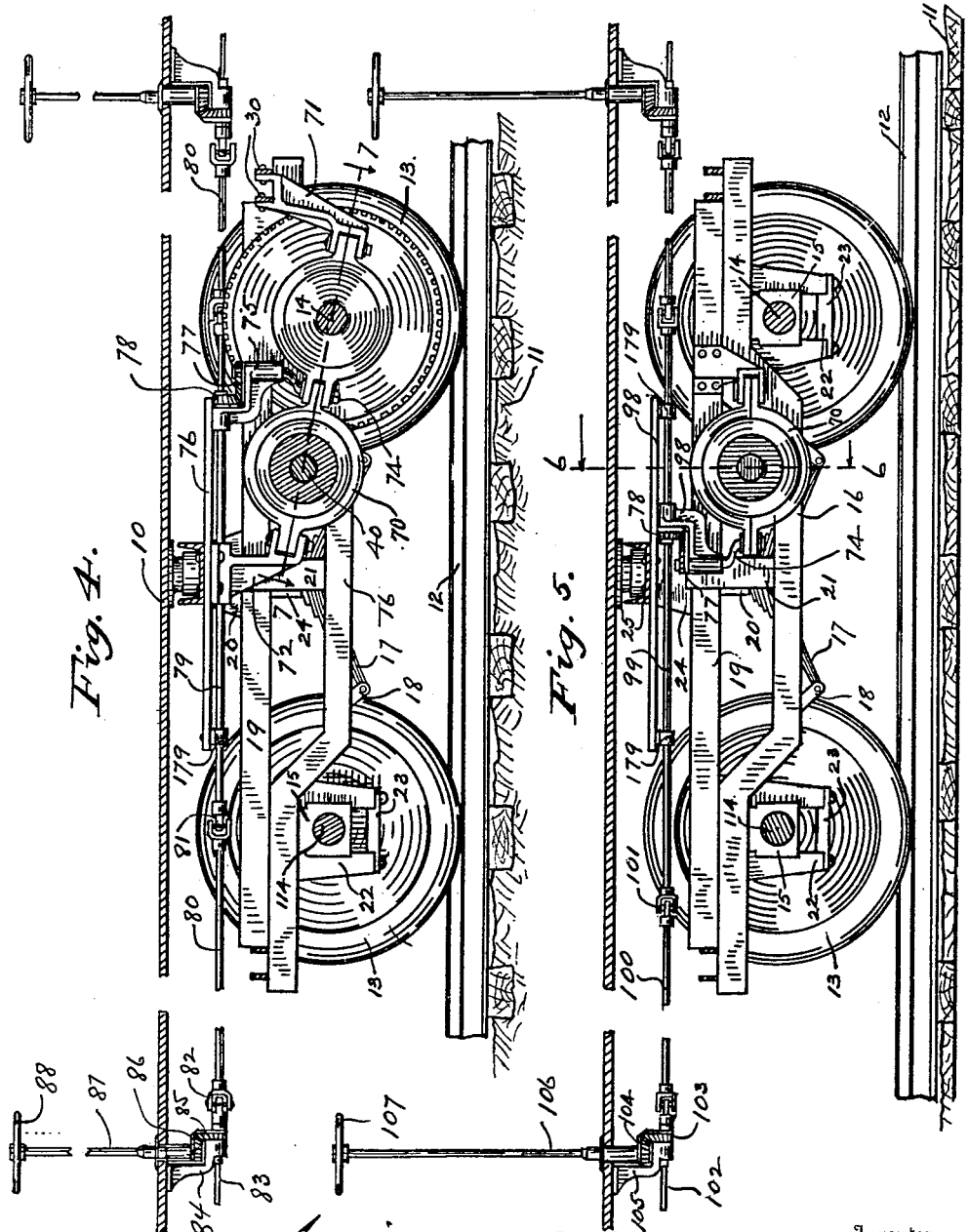

No. 831,948. PATENTED SEPT. 25, 1906.
G. S. GUNDERSEN.
RAILWAY MOTOR TRUCK.
APPLICATION FILED JUNE 19, 1903. RENEWED APR. 12, 1906.
4 SHEETS—SHEET 4.
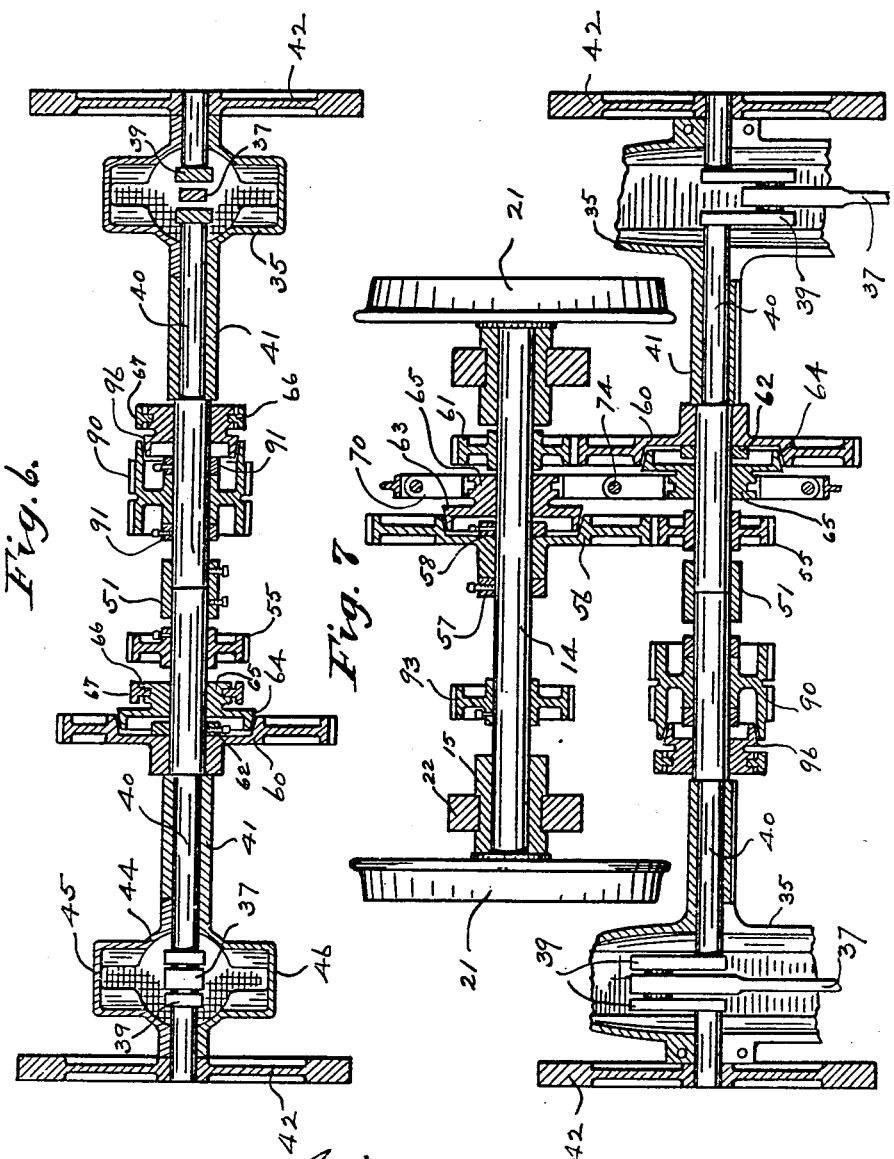
Witnesses
R. P. King.
H. G. Stuart
Inventor
Gilbert S. Gundersen
By V. H. Lockwood
His Attorney

UNITED STATES PATENT OFFICE.

GILBERT S. GUNDERSEN, OF COLUMBUS, INDIANA.

RAILWAY MOTOR-TRUCK.

No. 831,948.　　　　Specification of Letters Patent.　　　　Patented Sept. 25, 1906.

Application filed June 19, 1903. Renewed April 12, 1906. Serial No. 311,243.

*To all whom it may concern:*

Be it known that I, GILBERT S. GUNDERSEN, a citizen of the United States, residing at Columbus, in the county of Bartholomew and State of Indiana, have invented a new and useful Railway Motor-Truck, of which the following is a specification.

My invention relates to improvements in railway motor-trucks, the objects being, first, to provide a truck of such construction as to admit of the engines being secured to the frame of the truck and carried thereon; second, to provide a truck of such construction as to admit of its being operated at various speeds; third, to provide a truck of such construction as to admit of its operation from the vestibule in either end of the car; fourth, to provide a truck of such construction as to admit of its being reversed or to run either forward or backward; fifth, to provide a truck having a simple and effective means of applying the power from the crank or motor shaft on both the front and rear axles; sixth, to provide a truck having friction-clutches of such construction as to admit of the car being started slowly, thus preventing undue strain of the machinery and the unpleasant effects to the passengers of a sudden movement of the car.

The above features and the other features of my invention will be understood from the accompanying drawings and the following description and claims.

Figure 1:
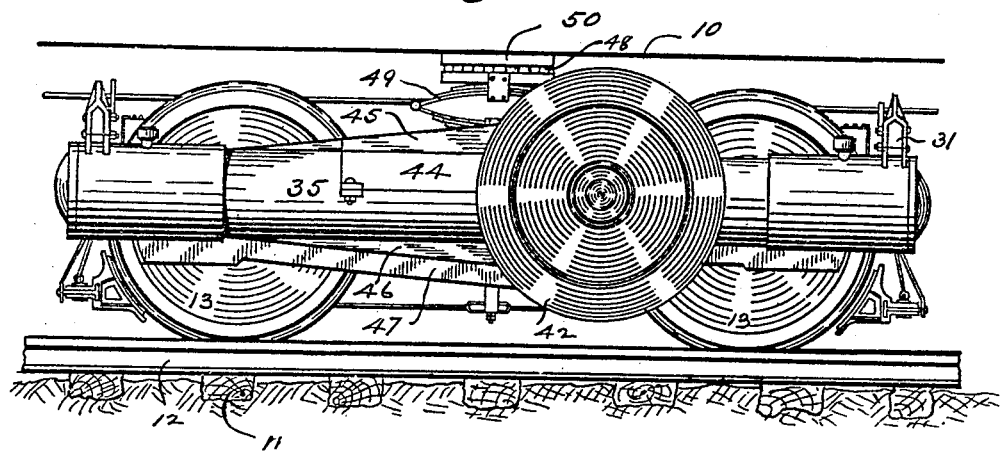
Figure 2:
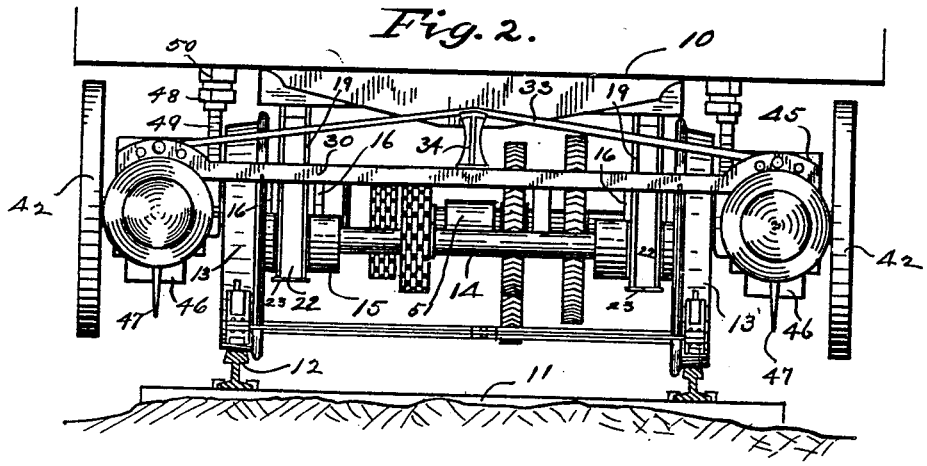

Figure 1 is a side elevation of a truck, showing an engine secured thereto and a part of the track. Fig. 2 is an end elevation of the truck with a transverse section of the track. Fig. 3 is a plan view of a truck, parts broken away. Fig. 4 is a longitudinal vertical section of a part of the floor of a car, parts centrally broken away, and also of a truck on the line 4 4 of Fig. 3, showing the clutch not operated. Fig. 5 is the same, showing the clutch operated. Fig. 6 is a transverse section of the driving-shaft and adjacent means on the line 6 6 of Fig. 5. Fig. 7 is substantially a horizontal section on the line 7 7 of Fig. 4, showing only the driving-shaft and axle and adjacent parts.

10 represents the bottom of the car that is mounted on the truck.

11 represents the railway-track, and 12 the rails.

There are two trucks under the car, one under each end. Only one of these trucks is shown, as they are duplicates.

The truck-wheels 13 are rigidly secured on the axles 14 and 114, there being four wheels and two axles on each truck. The axles are mounted in journal-bearings 15, which are rigidly secured between the bars 16. There is a pair of bars 16 at each side of the truck, and the journal-bearings at each side of the truck are secured between the two bars 16 near each end thereof. Between each pair of bars 16 there is hitched a spring 17. The ends of the springs are connected with knuckles 18, that are secured to and depend from the bars 16, as shown in Figs. 4 and 5. These springs 17 and the bars 16 receive the whole weight of the truck-frame and car above.

The truck-frame is mounted on the springs 17. In the first place there is a pair of longitudinally-extending bars 19, one pair at each side of the truck, centrally mounted on the spring 17 by means of a block 20 and a strap 21, and the ends of said bars 19 extend over the axles, and between the ends of each pair of bars 19 a pair of downwardly-extending guide-brackets 22 are secured. These guide-brackets extend on each side of the journal-bearing loosely and have a connecting-plate 23 at their lower end. Therefore the bars 19 and the guide-brackets 22 are vertically movable independent of the axles and journal-bearings.

Between and centrally upon each pair of bars 19 there is secured a block 24, and upon the blocks 24, one at each side of the truck, the cross-bar 25 is secured, completing the truck-frame. The bar 25 is an angle-bar, having an upwardly-extending flange along each edge, as shown in Figs. 4 and 5. Midway upon said bar there is secured a swiveled plate 26, as seen in Fig. 3. The car is mounted upon said swiveled plate in a well-known manner.

Upon each end of the four longitudinal bars 16 connected with each truck there is mounted a pair of cross-bars 30, with the ends thereof curved, as shown in Fig. 2, and secured to each side of a block 31, that is integral with the cylinder 32 of the engine at the side of the truck. These cross-bars 30 are strengthened by truss-rods 33, connected at their ends and centrally supported on a strut 34. The cross-bars 30 extend laterally beyond the wheels 13 and the frame of the truck, so that the engines are mounted outside the truck-frame and wheels, two engines or cylinders on each side of each truck. The pair of engines or cylinders on each side of each truck are connected by a frame 35, that is herein shown integral with the cylinders, which at each end is formed into a tubular chamber 36, through which the connecting-rod 37 extends and also the four piston-rods 38. The two piston-heads in the two cylinders on each side are connected by the four piston-rods 38, two above, as shown in Fig. 3, and two similar ones directly under them, so that the two piston-heads work together as one. Power is transmitted from them through the connecting-rod 37, which is connected with the piston-head at one end and at the other end to the crank 39 of the shaft 40. The shaft 40 extends transversely through the truck, as seen in Figs. 3, 6, and 7, and is mounted in bearings 41, that extend inwardly from the engine-frame 35, as shown in Fig. 6. A balance-wheel 42 is mounted on each end of said shaft 40 and outside of the engine-frame. A longitudinal semicylindrical cap 44, as shown in Fig. 1, closes the opening in the top of the engine-frame, as disclosed in Fig. 3. Said cap 44 and frame have an upward and also a downward extension 45 and 46 to accommodate the movement of the connecting-rod 37 on the crank 39. There is also a downwardly-extending flange 47 from the engine-frame for the purpose of reinforcing it.

On the inside of each engine-frame 35 there is secured a horizontally-curved or radial guide 48, mounted upon the springs 49. As shown in Fig. 3, the guides on each side are curved concentric with the swiveled plate 26, and bearing-blocks 50, secured to the inside of the car, rest loosely upon said guides. This construction permits the truck to have a swivel movement independent of the car.

The shaft 40 is preferably formed in the manner shown in Figs. 6 and 7 of two ends coupled by the coupling 51. It is also turned down somewhat within the bearings 41, as shown.

The power is transmitted from the shaft 40 to the axles as follows: The car is driven forward by power transmitted from the shaft 40 to the axle 14, and the car is driven backward or reversed by power transmitted to both axles 14 and 114 by said shaft. Attention will first be given to the means for driving the car forward. On the shaft 40 there is a rigidly-mounted pinion 55, that meshes with a larger gear 56, that is loosely mounted on the axle 14. This latter wheel is held from lateral movement on the axle by the collars 57 and 58. The axle is driven at a slow speed through the gears 55 and 56. It is driven at a high speed through the large gear 60 and the pinion 61. This latter pinion is secured on the axle, and the large gear-wheel 60 is loosely mounted on the shaft 40, that is held from lateral movement by the journal-box 41 on one side and the collar 62 on the other side. The large gear-wheels 56 and 60 are engaged by clutches 63 and 64, respectively, as shown in Fig. 7. These are shown herein as friction-clutches, being tapering and entering a flaring seat in the side of the gear-wheels, but any other sort of clutch may be employed. It is necessary, however, that said clutches be connected so that only one can be operated at a time.

When the car is being started and it is going at slow speed, only the clutch 63 is thrown into engagement. That drives the axle through the wheel 56. After the car has been started and a higher speed is desired that clutch is released and the other clutch 64 is thrown into engagement with the wheel 60. In Fig. 7 both clutches are shown out of engagement. Each clutch has connected with it and as a part of it a hub 65, that is peripherally grooved to receive an annular tongue 66 from a band 67, that surrounds the hub, and the bands 67 on the hubs of the clutches are pivotally connected by pins 68, extending through openings 69 in straps 70.

There are two pins 68, one extending upward, as appears in Fig. 3, and the other (not shown) extending downward diametrically opposite the pin shown. The straps 70 are at opposite ends pivotally connected with downwardly-extending brackets 71 and 72. The former bracket (see Fig. 4) is connected with the cross-bars 30, and the latter bracket 72 is secured to the bottom of the wide cross-bar 25. The two straps 70 are both pivotally connected with the crank-shaft 74, which is at its upper end mounted vertically in a bracket 75, that is secured to the under side of the end of a longitudinal plate 76, which in turn is secured to the under side of the wide cross-bar 25, as seen in Fig. 4. Consequently when the crank-shaft 74 is turned in one direction it will throw one of said clutches into engagement and the other out, and the reverse is true, because said clutches feed in opposite directions, as seen in Fig. 7. When the crank-shaft is in an intermediate position, as shown in Fig. 7, neither clutch will be in engagement.

The clutches above described are actuated through the crank-shaft 75 by the bevel-pinion 77, secured on the upper end of the crank-shaft 74, and the companion bevel-pinion 78 is secured on a longitudinally-extending shaft 79, that extends under the plate 76 and is mounted in the upper part of the bracket 75 and also in a bearing 179 at the other end of the plate 76. Said shaft 79 is coupled at each end with another shaft 80 by a knuckle-joint 81, and the shafts 80 are connected by knuckle-joints 82 to other shafts 83, that are mounted in brackets 84, secured on the under side of the two ends of the floor of the car. A bevel-pinion 85 is secured on each shaft 83 and meshes with the pinion 86, secured on the lower end of the vertical shaft 87, that extends up through the floor of the car and has a hand-wheel 88 on the upper end thereof for the use of the motorman. With this mechanism, therefore, the clutches 63 and 64 may be actuated from either end of the car for throwing the driving mechanism into and out of gear or for changing from a slow-speed to a high-speed driving mechanism, or vice versa.

Turning now to the means for driving the car backward or reversing, there is a double sprocket-wheel 90 mounted loosely on the shaft 40 between the collars 91. (See Fig. 6.) From said sprocket-wheel 90 a short chain 92 runs to a sprocket-wheel 93 on the axle 14, and a long chain 94 runs to a sprocket-wheel 95 on the other axle 114. The double sprocket-wheel 90 is thrown into and out of operative connection with the shaft 40 by a clutch 96, made like either of the clutches 63 or 64, and at one end the band 70 is pivoted to a bracket 97, mounted on the side of one of the longitudinal bars 19. The other end of the strap 70 and the clutch are actuated by a crank-shaft 74 in a bracket 98, secured to the under side of the plate that is secured to the under side of the wide cross-bar 25, as seen in Fig. 5. The pinion 78 is mounted on a shaft 99, similar to the shaft 79, and connected with shafts 100 by knuckle-joints 101, and the shafts 100 are connected with shafts 102 by knuckle-joints, and the pinions 103 and 104 are mounted, like the pinions 85 and 86, on a bracket 105, just like the bracket 84, and the pinion 104 is in the lower end of the shaft 106 with a hand-wheel 107 arranged similar to the same parts 87 and 88, heretofore described. Therefore at each end of the car there are two hand-wheels for the motorman to operate, one for moving forward and the other for reversing. The two trucks are similarly situated under the car and the lines of shafting 79 and 80 in the one instance and 99 and 100 in the other instance, through both trucks, under the same car from one end of the car to the other and operate upon similar clutches in both trucks to produce the same effect on each truck, so that the clutches in both trucks are operated simultaneously and by a single means. No means are here shown to vary the speed when running in the reverse direction.

What I claim as my invention, and desire to secure by Letters Patent, is—

1. In a railway motor-truck having suitable axles and wheels, a frame mounted thereon by means of bearings between the wheels, an engine mounted in connection with each side of said frame outside the wheels, piston-rods connecting the pistons of the engine at each side, a crank-shaft mounted in connection with said frame transversely thereof, a connecting-rod for transmitting power from the pistons to the crank-shaft, and means for transmitting power from the crank-shaft to an axle.

2. In a railway motor-truck having suitable axles and wheels, a frame mounted on said axles, a pair of oppositely-placed engine-cylinders mounted in connection with said frame, a casing extending from one of said cylinders to the other that may be closed, a crank-shaft mounted on the frame with the crank thereof within said casing, piston-rods within said casing connecting the pistons of the two cylinders, a connecting-rod within the casing for transmitting power from the pistons to the crank of the crank-shaft, and means for transmitting power from the crank-shaft to an axle.

3. In a railway motor-truck having suitable axles and wheels, a frame mounted on said axles, a pair of oppositely-placed engine-cylinders mounted in connection with said frame, a crank-shaft extending between said cylinders with the crank thereof in line with said cylinders, four piston-rods connecting the pistons in said cylinders, two being above and two below and out of the way of the crank on the crank-shaft, a connecting-rod for transmitting power from the engines to the crank of the crank-shaft, a casing connecting the two engine-cylinders that surrounds the piston-rods, connecting-rod, and crank of the crank-shaft and with its central and upper portion removable, said casing having downwardly and upwardly extending portions to accommodate the movement of the crank, connecting-rod, and piston-rods, and means for transmitting power from the crank-shaft to an axle.

4. In a railway motor-truck having suitable axles and wheels, a frame mounted thereon by means of bearings between the wheels, said frame consisting of longitudinal bars located between the wheels and transverse bars carried by said longitudinal bars, said transverse bars extending laterally beyond the wheels, engines mounted on the ends of the transverse bars of said frame that extend beyond the wheels so that said engines will be outside the wheels on both sides of the truck, a transverse crank-shaft mounted in connection with the frame and having a crank thereon beyond the wheels on each side and in line with the engines and driven by said engines, and means located between the wheels for transmitting power from the crank-shaft to an axle.

5. In a railway motor-truck having suitable axles and wheels, a frame mounted on said axles by means of bearings between the wheels, said frame consisting of longitudinal bars between the wheels and transverse bars mounted on said longitudinal bars at each end of the truck with the ends thereof extending laterally beyond the wheels, engine-cylinders secured to each end of said transverse bars so that there are four cylinders to a truck, two on each side and all outside the wheels, a rigid casing connecting the cylinders at each side so that the casing together with said transverse bars of the frame will hold the cylinders and associate parts in place, a crank-shaft mounted transversely between the wheels of the truck and in connection with the frame and extending through the casing connecting the cylinders and with a crank thereon within each casing, piston-rods connecting the pistons in each pair of cylinders, a connecting-rod for transmitting power from each pair of cylinders to the crank-shaft, and means located between the the wheels for transmitting power from the crank-shaft to an axle.

6. In a railway motor-truck having suitable axles and wheels, a frame mounted on said axles by means of bearings between the wheels, said frame consisting of longitudinal bars between the wheels and transverse bars mounted on said longitudinal bars at each end of the truck with the ends thereof extending laterally beyond the wheels, engine-cylinders secured to each end of said transverse bars so that there are four cylinders to a truck, two on each side and all outside the wheels, a rigid casing connecting the cylinders at each side so that the casing together with said transverse bars of the frame will hold the cylinders and associate parts in place a crank-shaft mounted transversely between the wheels of the truck and in connection with the frame and extending through the casing connecting the cylinders and with a crank thereon within each casing, piston-rods connecting the pistons in each pair of cylinders, a connecting-rod for transmitting power from each pair of cylinders to the crank-shaft, means located between the wheels for transmitting power from the crank-shaft to an axle, and a balance-wheel on each end of said crank-shaft.

7. In a railway motor-truck having an axle, a crank-shaft parallel therewith, means for driving the crank-shaft, a pinion secured on the axle and another pinion secured on the crank-shaft, a gear-wheel loosely mounted on the crank-shaft to mesh with the pinion on the axle, and another gear-wheel loosely mounted on the axle to mesh with the pinion on the crank-shaft, a clutch mounted on the axle in connection with the gear thereon, and a clutch mounted on the crank-shaft in connection with the loose gear on it, and means for operating and controlling said clutches.

8. In a railway motor-truck having a suitable axle, a crank-shaft parallel therewith, means for driving the crank-shaft, a pinion secured on the axle and another pinion secured on the crank-shaft, a gear-wheel loosely mounted on the crank-shaft to mesh with the pinion on the axle and another gear-wheel loosely mounted on the axle to mesh with the pinion on the crank-shaft, a clutch mounted on the axle in connection with the gear thereon, and a clutch mounted on the crank-shaft in connection with the loose gear on it, and a single means for simultaneously throwing one of said clutches into connection with its gear and the other clutch out of connection with its gear.

9. In a railway motor-truck having a suitable axle, a crank-shaft parallel therewith, means for driving the crank-shaft, a pinion secured on the axle and another pinion secured on the crank-shaft, a gear-wheel loosely mounted on the crank-shaft to mesh with the pinion on the axle, and another gear-wheel loosely mounted on the axle to mesh with the pinion on the crank-shaft, a clutch mounted on the axle in connection with the gear thereon and another clutch mounted on the crank-shaft in connection with the loose gear on it, means for operating and controlling said clutches, and means operated from either end of the car with which the truck may be connected for operating said clutches.

10. In a railway motor-truck having suitable axles and wheels, a frame mounted on the axles, a driving crank-shaft mounted in connection with the frame parallel with the axles, two independent means for transmitting power from the crank-shaft to an axle, a pair of clutches movable in opposite directions for throwing said power-transmitting means into and out of operation, a band surrounding each clutch and connected therewith so that the movement of the band will cause the movement of the clutch, means for pivotally connecting said clutch-moving bands at their adjacent ends, means connected with the frame to which the outer ends of said clutch-moving bands are pivotally connected, and means for laterally moving said bands midway between the two so that when the bands are moved in one direction one of the clutches will be released and the other moved into engagement.

11. The combination with a car, of a double set of trucks, an engine mounted at each side of each truck, all said engines coöperating to drive the car, and means for simultaneously operating and controlling said power transmission.

12. The combination with a car, of a double set of trucks, each truck being provided with a driving-shaft, two means for transmitting power from the driving-shaft to an axle of each truck, a pair of clutches in each truck for throwing said power-transmitting means into and out of operation so arranged that they will throw one power-transmitting means out of operation when it is moved to throw the other power power-transmitting means into operation, and means for simultaneously and similarly operating and controlling the clutches and power-transmitting means on the two trucks.

GILBERT S. GUNDERSEN.

Witnesses:
E. L. WILLIAMS,
O. M. DAVIS.